(12) United States Patent
Schwitter et al.

(10) Patent No.: US 7,910,652 B2
(45) Date of Patent: *Mar. 22, 2011

(54) POLYAMIDE MOLDING MATERIALS WITH AN IMPROVED FLOWABILITY, THE PRODUCTION THEREOF AND ITS USE

(75) Inventors: Paul Schwitter, Schaenis (CH); Georg Stoeppelmann, Boanduz (CH); Alex Stolarz, Bonaduz (CH); Helmut Thullen, Bonaduz (CH)

(73) Assignee: Ems-Chemie AG, Domat-Ems (CH)

( * ) Notice: Subject to any disclaimer, the term of this patent is extended or adjusted under 35 U.S.C. 154(b) by 111 days.

This patent is subject to a terminal disclaimer.

(21) Appl. No.: 11/914,920

(22) PCT Filed: Mar. 24, 2006

(86) PCT No.: PCT/EP2006/002725
§ 371 (c)(1),
(2), (4) Date: Mar. 7, 2008

(87) PCT Pub. No.: WO2006/122602
PCT Pub. Date: Nov. 23, 2006

(65) Prior Publication Data
US 2009/0131569 A1 May 21, 2009

(30) Foreign Application Priority Data
May 20, 2005 (DE) .......................... 10 2005 023 420

(51) Int. Cl.
*C08G 69/26* (2006.01)
*C08L 51/00* (2006.01)
*C08L 77/00* (2006.01)
*C08K 5/34* (2006.01)
*C08K 5/3435* (2006.01)
*C08K 3/04* (2006.01)
*C08K 3/34* (2006.01)
*C08K 3/22* (2006.01)
*C08K 3/00* (2006.01)
*C08K 3/30* (2006.01)
*B60C 1/00* (2006.01)
*C08J 3/22* (2006.01)
*H01B 1/12* (2006.01)
*C07D 211/56* (2006.01)
*C07D 211/98* (2006.01)

(52) U.S. Cl. .......... 524/538; 524/98; 524/495; 524/496; 524/451; 524/449; 524/445; 524/497; 524/401; 524/418; 524/210; 524/227; 525/432; 528/332; 528/335; 528/347; 546/244; 252/511

(58) Field of Classification Search .................. 524/495, 524/496; 528/323, 332, 335, 347; 525/432
See application file for complete search history.

(56) References Cited

U.S. PATENT DOCUMENTS

| | | | | |
|---|---|---|---|---|
| 3,687,904 A * | 8/1972 | Middleton | ..................... | 528/323 |
| 3,711,447 A | 1/1973 | Jakob et al. | | |
| 4,847,333 A * | 7/1989 | Lubowitz et al. | .............. | 525/432 |
| 5,112,908 A * | 5/1992 | Epstein | ........................... | 525/66 |
| 5,154,881 A | 10/1992 | Rutz et al. | | |
| 5,274,033 A * | 12/1993 | Epstein | ........................... | 525/66 |
| 5,288,799 A | 2/1994 | Schmid | | |
| 5,618,909 A | 4/1997 | Lofquist et al. | | |
| 5,643,502 A | 7/1997 | Nahass et al. | | |
| 5,744,433 A | 4/1998 | Storström et al. | | |
| 5,763,561 A * | 6/1998 | Keske | ........................... | 528/310 |
| 6,150,496 A | 11/2000 | Ilg et al. | | |
| 6,267,148 B1 * | 7/2001 | Katayama et al. | ............ | 138/137 |
| 6,528,572 B1 * | 3/2003 | Patel et al. | .................... | 524/495 |
| 6,548,591 B2 * | 4/2003 | Koning et al. | ................ | 524/494 |
| 6,942,823 B2 * | 9/2005 | Terada et al. | ................. | 252/511 |
| 2003/0029272 A1 | 2/2003 | Vidarsson et al. | | |
| 2004/0082729 A1 * | 4/2004 | Terada et al. | ................. | 525/390 |
| 2004/0171720 A1 * | 9/2004 | Dames et al. | ................... | 524/90 |
| 2005/0084686 A1 * | 4/2005 | Imaizumi | .................. | 428/425.5 |
| 2006/0014866 A1 * | 1/2006 | Ottenheijm | .................. | 524/115 |
| 2008/0268167 A1 * | 10/2008 | Gerteisen et al. | ............. | 427/487 |
| 2009/0131569 A1 | 5/2009 | Schwitter et al. | | |
| 2009/0131674 A1 | 5/2009 | Schmid et al. | | |

FOREIGN PATENT DOCUMENTS

| | | |
|---|---|---|
| DE | 3901716 A1 | 7/1990 |
| DE | 3901717 A1 | 7/1990 |
| DE | 3930089 A1 | 3/1991 |
| DE | 3932912 A1 | 4/1991 |
| DE | 4131926 A1 | 4/1992 |
| DE | 19537614 A1 | 4/1997 |
| DE | 19745099 A1 | 4/1999 |

(Continued)

OTHER PUBLICATIONS

English Language Abstract of JP 2005-146269 A, Sep. 6, 2005.
R.G. Gilg, "Carbon Black for Conductive Plastic Materials" in: Electrically conductive Plastic Materials, publishers: H.J. Mair, S. Roth, 2$^{nd}$ Edition, Carl Hanser Verlag, 1989, Munich Vienna, pp. 21-36 (Russ Fuer Leitfahige Kunststoffe, p. 21-36).
Plastics 2000, 9, pp. 116-118 (Technische Kunststoffe 2000, p. 116-118).

(Continued)

*Primary Examiner* — Vasu Jagannathan
*Assistant Examiner* — Anthony H Sheh
(74) *Attorney, Agent, or Firm* — Greenblum & Bernstein, P.L.C.

(57) ABSTRACT

The invention relates to a polyamide moulding compound containing 70 to 99.5% by weight of at least one thermoplastic polyamide and 0.5 to 30% by weight of at least one polyamide oligomer with linear or branched chain structure with a number average molar mass of 800 to 5000 g/mol with basic end groups which are at least partially $NH_2$ end groups, and carboxyl end groups, one of these end groups being present in excess and the concentration of the end group present in excess being at most 300 mmol/kg.

34 Claims, 1 Drawing Sheet

FOREIGN PATENT DOCUMENTS

| | | |
|---|---|---|
| DE | 10247470 A1 | 4/2004 |
| DE | 10255044 A1 | 6/2004 |
| EP | 272695 A2 * | 6/1988 |
| EP | 0272695 A2 | 6/1988 |
| EP | 0272695 A3 | 6/1988 |
| EP | 0261020 B1 | 12/1990 |
| EP | 0555578 A2 | 8/1993 |
| EP | 0555578 A3 | 8/1993 |
| EP | 0345645 A1 | 8/1995 |
| EP | 0345645 B1 | 8/1995 |
| EP | 0272695 B2 | 7/1997 |
| EP | 0957131 A2 | 11/1999 |
| EP | 0957131 A3 | 11/1999 |
| EP | 1125985 A1 | 8/2001 |
| EP | 0953796 B | 7/2003 |
| EP | 0957131 B1 | 7/2003 |
| EP | 1217039 B1 | 7/2004 |
| EP | 1454963 A1 | 9/2004 |
| JP | 2005-146269 A | 9/2005 |
| WO | 90/08807 A1 | 8/1990 |
| WO | 02/083345 A1 | 10/2002 |
| WO | 02/083346 A1 | 10/2002 |
| WO | 2004/055109 A2 | 7/2004 |
| WO | 2004/055109 A3 | 7/2004 |
| WO | 2005/000953 A2 | 1/2005 |
| WO | 2005/000953 A3 | 1/2005 |
| WO | 2005/032817 A1 | 4/2005 |
| WO | 2006/122633 A1 | 4/2006 |

OTHER PUBLICATIONS

Holleman-Widberg, "Textbook of Inorganic Chemistry" $91^{st}$-$100^{th}$ edition, pp. 701-702, 1985 (Lehrbuch der anorganishen Chemie, p. 701-702, 1985).

U.S. Appl. No. 11/914,916 to Eduard Schmid et al., I.A. filed Apr. 24, 2006, entitled "Polymide Oligomers and Their Use".

U.S. Appl. No. 12/550,239, to Schwitter et al.

* cited by examiner

Figure
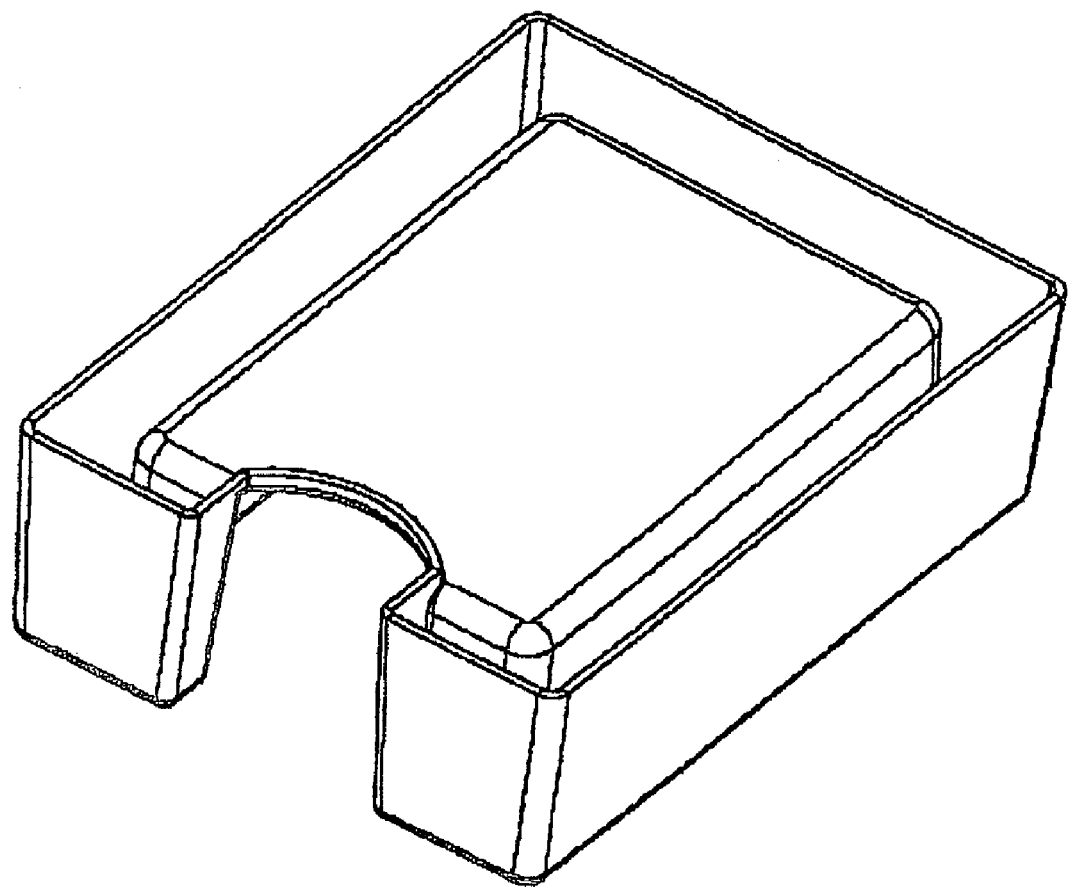

POLYAMIDE MOLDING MATERIALS WITH AN IMPROVED FLOWABILITY, THE PRODUCTION THEREOF AND ITS USE

The invention relates to polyamide moulding compounds containing viscosity-stable polyamide oligomers with significantly improved flowability, production thereof and use thereof.

In order to produce conductive thermoplastics, normally conductive substances are used, such as e.g. carbon black, carbon fibres, graphite, metal fibres and metal powders, metallized glass fibres or conductive polymers with conjugated electron system, such as for example polyaniline, poly-paraphenylene vinylene or polythiophene.

In addition to the conductivity, in particular in applications in the automotive field, high requirements, such as e.g. with respect to first-class surface quality, high toughness, low density and high flowability, are also placed on the thermoplastics. As conductivity additive, frequently carbon is used for thermoplastics in various modifications, such as e.g. carbon black, carbon fibres, graphite or graphite fibres or fibrils, the diameter of which is between 1 and 500 nm.

By using carbon black and carbon fibres, the result is frequently an impairment in surface quality, toughness and flowability due to the high concentration which is required, because comparatively high carbon black concentrations are required for the demanded conductivities (R. G. Gilg, "Carbon black for conductive plastic materials" in: Electrically conductive plastic materials, publishers: H. J. Mair, S. Roth, $2^{nd}$ edition, Carl Hanser Verlag, 1989, Munich, Vienna, page 21-36).

By using carbon nanofibrils, as are offered for sale for example by the company Hyperion Catalysis, only comparatively small quantities need be added in order to achieve sufficient conductivities (U.S. Pat. No. 5,643,502). However homogeneous dispersion of the carbon nanofibrils in the polymer matrix is very difficult since graphite fibres tend to form aggregates. This limits the use of carbon nanofibrils greatly and demands use of master batches. In addition, the availability of carbon nanofibrils is restricted greatly by the complex and very expensive production process.

Carbon black-filled and peroxide-stable moulding compounds are described for example in EP 0 953 796 B1. The advantage of these polyamide moulding compounds in which carbon blacks with a low specific surface are used resides in the very good resistance to sour gas. However, it is disadvantageous that the melt viscosity increases greatly by using carbon black and hence processing with injection moulding machines, in particular when producing thin-walled parts, presents problems since the flowability of the melt is too low.

Highly flowable low-viscosity thermoplastic compositions are of interest for a multiplicity of injection moulding applications. For example, thin-walled components in the electrical, electronics or automotive industry demand low melt viscosities of the thermoplastic compositions in order that filling of the mould is possible with the lowest possible filling pressures. Furthermore, shorter cycle times can also frequently be achieved with low-viscosity polymer compositions. Furthermore, good flowability is extremely important precisely with highly filled polymer compositions, for example with contents of glass or carbon fibres or mineral of above 40%, in particular if carbon black is also added as conductivity additive in addition. Despite high flowability, high mechanical requirements are however placed on the components so that no impairment in the mechanical properties should be caused due to the lowering of the viscosity.

The simplest way to improve the flowability of polymers resides in reducing the molar mass thereof. It must however be taken into account as a disadvantage that the mechanical properties of the polymers are in part drastically impaired.

U.S. Pat. No. 6,548,591 B2 describes a thermoplastic polyamide moulding compound, an improvement in the flow behaviour being achieved by using a low-molecular weight polyamide with a higher melt temperature. Because of the fact that an oligomer which melts higher than the matrix should be used, the result can be incompatibilities between matrix and oligomer. This is revealed for example in the fact that, at 5% by weight of a PA66 oligomer, the impact strength of a high-molecular weight polyamide 6 is reduced from 90 $kJ/m^2$ to 30 $kJ/m^2$.

In EP 0 957 131 B1, the improvement in flow properties of polyamide moulding compounds by the addition of polyamide prepolymers, i.e. polyamide oligomers provided with reactive end groups, is described. These prepolymers have the disadvantage, because of the high end group concentration, amino and carboxyl groups being present at the same time, that they are not viscosity-stable during compounding with the high-molecular weight component and during the subsequent processing. An undesired increase in viscosity occurs, which in turn impairs the flowability.

Because of the high concentration of amino and carboxyl groups of these prepolymers, undesired reactions can also occur with further ingredient components, such as e.g. the stabilisers, glass fibre sizings or impact strength modifiers.

Another possibility is the use of so-called anti-blocking agents, also described as flow aids or internal lubricants which can be added to the high-molecular weight polymer as an additive. Flow aids of this type are known in the literature (such as e.g. from Plastics 2000, 9, page 116-118) and can be for example fatty acid esters of polyols or amides from fatty acids and amines. Fatty acid esters of this type, for example pentaerythritol tetrastearate or ethylene glycol dimontanoate, are however miscible only in a limited fashion with polar thermoplastics, such as polyamides, and have therefore a tendency to migration and concentration on the surface of the moulded article. This can be disadvantageous with respect to adhesion in multilayer composites or of paints and metals in the case of coated moulded articles.

As an alternative to the surface-active flow aids, internal flow aids can be used which are compatible with the polymer. There are suitable for this purpose for example, low-molecular weight compounds or branched or dendritic polymers with a polarity similar to the polymer matrix. Highly branched dendritic systems of this type are described for example in DE 102 55 044 A1.

Flow-improving properties of graft copolymers are known for example from EP 1 217 039 B1. This publication describes an easily flowing polyester moulding compound comprising thermoplastic polyester and a polyamine/polyamide graft copolymer.

The flow-improving effect of fluorocarbon polymers is described in EP 1 454 963 A1. The high price of fluorocarbon polymers, the danger of corrosion and the low effectiveness in polyamides is disadvantageous.

It is therefore the object of the invention to make available highly flowable polyamide moulding compounds, with which thin-walled components with good mechanical properties can be produced and which do not have the disadvantages of the state of the art.

The object of the invention is achieved with respect to the polyamide moulding compounds by the features of claim 1, with respect to the moulded articles which can be produced therefrom by the features of claim 33 and, with respect to the use, by the features of claim 34. The sub-claims reveal advantageous developments.

The polyamide moulding compounds according to the invention contain 70 to 99.5% by weight at least of a thermoplastic polyamide and 0.5 to 30% by weight at least of a polyamide oligomer with a linear or blanched chain structure, with a number average molar mass of 800 to 5000 g/mol with basic end groups which are at least partially $NH_2$ end groups, and carboxyl end groups, one of these end groups being present in excess and the concentration of the end group occurring in excess being at most 300 mmol/kg. According to the invention, the polyamide moulding compounds extend to all polyamides, i.e. crystalline or amorphous polyamides or mixtures thereof.

The subject of the present invention resides hence in that additional proportions of viscosity-stable polyamide oligomers are incorporated in the polyamide moulding compounds.

The polyamide oligomers contained lead to a reduction in the melt viscosity of the moulding compounds and hence to a significantly improved processability, in particular in the case of thin-walled moulded articles. The polyamide oligomers according to the invention cannot thereby migrate, like e.g. certain low-molecular weight plasticizers, and hence do not form or only slightly form coatings on the moulded articles or the tool surfaces.

Likewise, the surface quality, in particular of reinforced readymade parts, is greatly improved. Because of the fillers, the surface is often rough and spotted or displays indentations and irregularities. The addition of the polyamide oligomers effects a smoother and more uniform surface of the moulded articles and endows them with high gloss.

Possibly added fillers and conductivity additives are wetted well by the polyamide oligomers and hence facilitate incorporation, in particular with high filling degrees.

The polyamide oligomers which are suitable for this purpose are added to the high-molecular weight polyamide in the melt, together with other components of the composition.

Due to the choice of monomers, the polyamide oligomers have only few condensable chain ends, approximately comparable to the end group concentration of the normal polyamides of average and high molar mass.

Because of this end group configuration of the polyamide oligomers according to the invention, neither a significant polymer build-up with respect to the oligomers nor decomposition of the polymer matrix occurs during compounding or processing so that the polyamide moulding compounds according to the invention are melt-stable. Furthermore, secondary reactions with other ingredient components in practice do not occur. Because of the similar polarity of oligomer and polymer matrix, good compatibility is provided between the components, as a result of which disadvantageous exudation is avoided.

The viscosity-stable polyamide oligomers according to the invention have a linear or branched chain structure, a molar mass less than 5000 g/mol and are distinguished in that at least 50%, preferably 60-80% of the chain ends are not condensation-active and either the basic or the acidic chain ends predominate in total. Independently of the molar mass of the polyamide oligomers, the maximum concentration of primary amino end groups or COOH end groups is 300, preferably 100 mmol/kg.

Both aminic functional groups, such as $R_3N$, $R_2NH$, $RNH_2$, and also carboxylate, i.e. the deprotonated carboxyl functionality, thereby apply as basic component, which can be found on the chain end or in the oligomer structure.

The polyamide oligomers according to the invention have accordingly only very few reactive end groups and are therefore practically no longer condensable with other functionalised constitutional units, such as monomers, oligomers or polymers. In contrast to the known reactive polyamide oligomers, the oligomers according to the invention are extraordinarily stable against decomposition as a pure substance and in a suitable mixture with polyamide moulding compounds and are even able extensively to prevent decomposition of such moulding compounds in the melt.

Polyamides can be constructed from a multiplicity of monomer constitutional units so that a multiplicity of special end properties is also possible. This high variation breadth applies also to the polyamide oligomers according to the invention. By choice and combination of the known polyamide constitutional units and via the targeted adjustment of the molar mass, properties, such as the crystallinity, the melt or glass conversion point, the affinity to substrates and the moisture content, i.e. the basic character of the oligomer, can be specifically adjusted.

It is also possible, in addition to the purely linear chain structure, to produce specifically branched oligomers. The rules which are thereby valid for polyamides, as are displayed e.g. in EP 0 345 645, apply to the specification of the branching structure also in the case of polyamide oligomers, in particular if the molar mass thereof is above 800 g/mol. Hence structure-branched polyamide oligomers are then reproducible and can be produced reproducibly without formation of deposits in the reactor if, in addition to the structure-forming constitutional units, exclusively amino acids and/or lactams are the basic monomers.

A feature relevant to the invention of the polyamide oligomers is not special choice of the constitutional units and their composition per se, but that they are low in condensation-active end groups and in particular that the ratio, remaining after the condensation reaction, of the end groups present in excess to the end group present in deficit is greater than 1:1, preferably greater than 2:1.

The concentration of end groups present in excess is thereby preferably at most 100 mmol/kg. Furthermore, if further amino end groups are present then these are the secondary or tertiary amino end groups which are not or only a little condensable. The substituents at the end-position secondary or tertiary amino end groups are preferably alkyl, cycloalkyl or aryl radicals with more than 4 C-atoms, in particular with 4 to 44 C-atoms. It is of particular significance that the polyamide oligomers can exert an excellent effect during thermoplastic processing of plastic material compounds and, for example the flowability of the melts is improved, the crystallisation speed can be increased and often the mould-release behaviour is substantially improved. Decomposition effects in the sense of a hydrolytic chain cleaving are thereby practically excluded and no corrosion occurs on the processing machines, as are known by COOH-containing compounds.

In order that the polyamide oligomers according to the invention are stable against decomposition per se or in a mixture with high-molecular weight polyamides, the concentration of end groups present in excess is at least 20, preferably at least 50 mmol/kg.

Polyamide moulding compounds containing polyamide oligomers astonishingly have excellent hydrolysis and weathering stability when the oligomer used contains a high concentration—expressed in mmol/kg—of basic groups. In the most advantageous manner, these are inserted into the oligomer structure if the compound used for the chain termination jointly includes, apart from the condensation-active $NH_2$ or COOH group, a sterically screened amino group (sec. or tert. amine), such as for example in the compounds of formulae (I), (II) and (IV). Such special chain-terminating constitutional units are e.g. N-alkylated diamines, such as e.g. cocopropylene diamine or C16-22-alkyl propylene diamine (Duomeen M. by Akzo), 3-cyclohexyl amino propylene diamine but in particular also triacetone diamine. The addition of correspondingly constructed polyamide oligomers into polyamide moulding compounds improves the hydrolysis and weathering stability thereof without expensive stabilisers, such as e.g. must be added specially of the so-called HALS type.

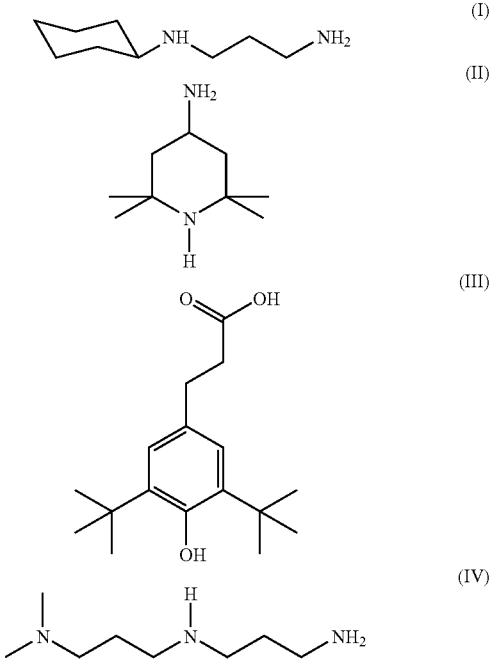

In addition it is possible to use monomer constitutional units jointly for the oligomer production, said monomer constitutional units jointly containing a sterically inhibited phenol structure in the molecule. During the addition to a plastic material compound in particular to a polyamide moulding compound, such an oligomer consequently improves the heat stability thereof in addition. A corresponding monocarboxylic acid, given by way of example, is 3-(3,5-di-tert.-butyl-4-hydroxyphenyl)-propionic acid (Irganox 1310 by Ciba SC), formula (III). If the polyamide oligomer is hence controlled in its molar mass following these possibilities and thus contains the sterically inhibited amine function at one chain end and the sterically inhibited phenol group at the other chain end, then with suitable addition, in particular to a polyamide moulding compound, it has the effect that said moulding compound has at the same time excellent hydrolysis, weathering and heat stability.

Of course, the most varied of combination options for controlling the chain length is possible according to the intended effect. For example only one part of the carboxylic acid can carry the sterically inhibited phenol function and the residual component can be monoalkyl in that a commercial stearic acid is for example jointly used and only a part can be a sterically inhibited amine and the remainder, for example a commercial fatty amine with e.g. 20 C-atoms. It is ensured by means of such special combinations that the polyamide oligomer develops its stabilising effect at the same time and furthermore acts excellently as lubricant and mould-release agent.

Monomers for the production of the polyamide oligomers according to the invention are linear and branched-chain diamines and dicarboxylic acids with 2 to 44 C-atoms, in addition cyclic, condensation-active diamines with aliphatic amine function, such as e.g. 1, 3 or 1,4-bisaminomethylcyclohexane or m- and p-xylylene diamine, bicyclic and thereby also repeatedly substituted diamines, such as e.g. 3,3'-dimethyl-4,4'-diamino-dicyclohexylmethane or also -propane or also the so-called TCD-diamine, (3(4),8(9)-bis(aminomethyl)-tricyclo[5.2.1.0$^{2,6}$]decane) or diamines with the norbornane structure. Suitable dicarboxylic acids are furthermore dimerised fatty acids and also iso- and terephthalic acid and naphthalenedicarboxylic acids.

The molar mass control is effected for example such that a monoamine and a monocarboxylic acid are added to the monomer constitutional units which are present in equimolar proportions, for example stearyl amine and stearic acid in the molar ratio of approx. 1:1.

A further possibility for control of the molar masses and end groups is, when using bi- or multifunctional compounds, to compensate for the thereby produced functional end groups of the one type by addition of a monofunctional compound of the other type, such as e.g. combination of a non-volatile ether diamine with the corresponding quantity of stearic acid.

When using amino acids or lactams, also tri- or even multifunctional compounds can be used to adjust the end group type and concentration, such as e.g. trimesic acid or ethylenediaminetetrapropionic acid. For the structural termination, then 3 or 4 equivalents monoamine, such as e.g. stearyl amine, are required. The procedure is thereby implemented such that a predetermined excess of one functionality remains and, for special effects, compounds are jointly used specifically which jointly contain an additional sterically inhibited amine function or a sterically inhibited phenol function.

A compound class which is very suitable for production of structure-branched oligomers is furthermore the so-called styrene-maleic acid anhydride resins with e.g. 5 to 10 maleic anhydride groups (MA) in the molecule. The MA group thereby reacts in the melt with an amine acid or a lactam with imide formation. This "oligomer arm" is then carboxyl-terminated and the chain termination is effected using a monoamine. Oligomers based on amino acid and lactam with this branching feature also have excellent flowability, even with a comparatively higher molar mass, and are hence particularly suitable for highly filled polyamide formulations with surfaces of excellent gloss.

The commercial production of the oligomers can be effected in reaction vessels, as are used for the production of normal polyamides, and it is subject essentially to the rules which are known for polyamide synthesis.

The polyamide oligomers added to the high-molecular weight polyamide moulding compounds, independently of the concentration, cause a very significant reduction in viscosity (90% in Example 1, approx. 900% in Example 3) so that the MVR can increase by a multiple. This can be detected also in the flow length. Dependent upon the concentration and the type of polyamide oligomer, increases in the flow length of above 100% can be achieved.

Furthermore, the combination of partially crystalline or amorphous polyamides with polyamide oligomers makes possible the production of low-distortion moulded bodies, in particular in highly reinforced or filled systems. During processing of the polyamide moulding compounds which contain PA oligomer and hence are more flowable, lower-stress moulded bodies are produced with as a rule improved surface quality. In particular in the case of amorphous polyamides and blends thereof with partially crystalline polyamides, the addition of polyamide oligomers according to the invention leads to a significant reduction in distortion. This effect appears all the more, the higher the concentration of fibrous and/or particulate fillers. Precisely the addition of small scale, particulate fillers, such as e.g. ground or precipitated calcium carbonate, aluminium silicate (kaolin) or magnesium silicate (talc), or even the addition of ground glass fibres, reduces the flowability of polyamide melts greatly so that processing is made difficult and, with respect to the production of low-distortion moulded articles, no optimum results are achieved. The addition of PA oligomers is able however also in these cases to reduce the melt viscosity of the PA moulding compounds to such an extent that, with optimal processing, moulded articles with low shrinkage and very low distortion are produced. Preferably, the distortion is thereby below 5%, very particular preferred below 3%.

As polyamides for the moulding compound according to the invention, advantageously polycondensates from aliphatic lactams or ω-aminocarboxylic acids with 4 to 44 carbon atoms, preferably 4 to 18 carbon atoms, or those from aromatic aminocarboxylic acids with 6 to 20 carbon atoms are used.

Likewise suitable are polycondensates from at least one diamine and at least one dicarboxylic acid with respectively 2 to 44 carbon atoms. Examples of such diamines are ethylene diamine, 1,4-diaminobutane, 1,6-diaminohexane, 1,10-diaminodecane, 1,12-diaminododecane, m- and p-xylylene diamine, cyclohexyldimethyleneamine, bis-(aminocyclohexyl)methane and the alkyl derivatives thereof.

Examples of dicarboxylic acids are succinic, glutaric, adipinic, pimelic, octanedioic, azelaic and sebacic acid, dodecanedicarboxylic acid, dimer fatty acids with 36 or 44 C-atoms, 1,6-cyclohexanedicarboxylic acid, terephthalic acid, isophthalic acid and naphthalenedicarboxylic acid.

Particularly suitable partially crystalline polyamides for the moulding compounds according to the invention are thereby homo- and copolyamides based on PA6, PA66, PA46, PA11, PA12, PA1212, PA1012, PA610, PA612, PA69, PA1010, PA6T, PA6T6I, PA6T66, PA9T, PA10T, PA12T, PA12I, mixtures or copolymers thereof based on these polyamides, PA6, PA66, PA11, PA12, PA1212, PA6T6I, PA6T66 being preferred. Preferred also are copolymers based on the above-mentioned polyamides, such as e.g. 12T/12, 10T/12, 12T/106 and 10T/106. Furthermore, also nylon 6/66, nylon 6/612, nylon 6/66/610, nylon 6/66/12, nylon 6/6T and nylon 6/6I can be used according to the invention.

Preferred amorphous or microcrystalline homo- and copolyamides have the following compositions: PA6I, 6I/6T, MXDI/6I, MXDI/MXDT/6I/6T, MXDI/12I, MACMI/12, MACMI/MACMT/12, 6I/MACMI/12, 6I/6T/MACMI/-MACMT/12, PACM6/11, PACM12, PACMI/PACM12, MACM6/11, MACM12, MACMI/MACM12, MACM12/PACM12, 6I/6T/PACMI/PACMT/PACM12/612. As cyclic diamines there are thereby possible, for example MACM (3,3 diamino-4,4-dimethyldicyclohexylmethane), PACM (3,3 diaminodicyclohexylmethane) or MXD (m-xylylene diamine).

A particularly preferred embodiment of the polyamide moulding compounds according to the invention provides that the moulding compounds contain in addition a conductivity additive. The conductivity additive is thereby contained in the polyamide moulding compound preferably in a quantity of 1 to 50% by weight, particularly preferred from 3 to 25% by weight, relative to the total polyamide moulding compound.

There are possible as conductivity additive for the polyamide moulding compounds according to the invention, carbon blacks with low and high specific surface and also mixtures thereof and carbon nanofibrils and mixtures of carbon blacks and carbon nanofibrils.

The carbon blacks according to the invention have a specific BET surface, measured according to ASTM standard D3037-89, of greater than 5 $m^2/g$ and a dibutylphthalate absorption, measured according to ASTM standard D2414-90, of greater than 50 ml/100 g. However, preferably used are carbon blacks with a specific surface according to the BET method of greater than 200 $m^2/g$ and a dibutylphthalate absorption of greater than 300 ml/100 g. Particularly preferred are carbon blacks with a BET surface in the range of 300 to 2000 $m^2/g$ and a dibutylphthalate absorption in the range of 350 to 1000 ml/100 g.

In the case of the conductivity carbon blacks according to the invention, the primary particle size is between 0.005 and 0.2 μm preferably between 0.01 and 0.1 μm. On the carbon black surface there can be located a multiplicity of oxygen-containing groups, such as for example carboxyl, lactol, phenol groups, quinoid carbonyl groups and/or pyrone structures.

During selection of the carbon blacks, in particular highly pure types are preferred since these endow the moulding compounds with high peroxide resistance. Highly pure means in this context that the carbon blacks used have an ash content of less than 0.1% by weight, a heavy metal content of less than 50 ppm and a sulphur content of less than 0.05% by weight.

Conductivity carbon blacks can for example be produced from acetylene, from synthesis gas or from the furnace process, from oil carrier gases and air. Production methods are described for example in R. G. Gilg, "Carbon black for conductive plastic materials" in: Electrically conductive plastic materials, publishers: H. J. Mair, S. Roth, $2^{nd}$ edition, Carl Hanser Verlag, 1989, Munich, Vienna, page 21-36.

Preferred carbon nanofibrils typically have the shape of tubes which are formed from at least one graphite layer. The graphite layers are disposed concentrically around the cylinder axis. Carbon nanofibrils have a length-to-diameter ratio of preferably at least 5:1, preferably of at least 100:1 and particularly preferred of at least 1000:1. The diameter of the nanofibrils is typically in the range of 0.001 to 0.5 μm, preferably in the range of 0.005 to 0.08 μm, particularly preferred in the range of 0.006 to 0.05 μm. The length of the carbon nanofibrils is typically 0.5 to 1000 μm, preferably 0.8 to 100 μm, particularly preferred 1 to 10 μm: The carbon nanofibrils have a hollow, cylindrical core around which the graphite layers are formally wound. This cavity typically has a diameter of 0.001 to 0.1 μm, preferably a diameter of 0.008 to 0.015 μm. In a typical embodiment of the carbon nanofibrils, the wall of the fibrils around the cavity comprises for example 8 graphite layers. The carbon nanofibrils can thereby be present as aggregates of up to 1000 μm diameter, preferably up to 500 μm diameter comprising a plurality of nanofibrils.

The addition of the carbon nanofibrils can be effected before, during or after the polymerisation or polycondensation of the monomers into the polyamide. If the addition of the nanofibrils according to the invention is effected after polymerisation, then it is effected preferably by addition to the polyamide melt in an extruder or in a kneader. By means of the compounding process in the kneader or extruder, in particular the already described aggregates can be extensively or even entirely comminuted and the carbon nanofibrils can be dispersed in the polyamide matrix.

In a preferred embodiment, the carbon nanofibrils can be added in metered amounts as highly concentrated master batches to the polyamides which preferably have the same chemical structure as the polyamide matrix. The concentration of carbon nanofibrils in the master batches is in the range of 5 to 50, preferably 8 to 30, particularly preferred in the range of 12 to 22% by weight. The production of master batches is described for example in U.S. Pat. No. 5,643,502. By using master batches, in particular the comminution of the aggregates can be improved. Due to processing into the moulding compound or moulded body, the carbon nanofibrils can have shorter length distributions in the moulding compound or in the moulded body than used originally. Carbon nanofibrils are offered for sale for example by the company Hyperion Catalysis. Synthesis of the carbon nanofibrils is effected for example in a reactor which contains a gas containing carbon and a metal catalyst, such as described e.g. in U.S. Pat. No. 5,643,502.

As further conductivity additive, the polyamide compositions, alone or in addition to carbon nanofibrils, can also contain particulate carbon compounds, such as carbon black which is suitable for the production of conductivity and is termed by the person skilled in the art also as conductivity carbon black, or graphite powder. This can also include expanded graphite.

According to the invention, graphite powders concern comminuted graphite. The person skilled in the art understands by graphite a modification of carbon, as is described for example in A. F. Hollemann, E. Wiberg, N. Wiberg, "Textbook of inorganic chemistry" $91^{st}$-$100^{th}$ edition, page 710-702. Graphite comprises planar carbon layers which are disposed one above the other. Graphite can be comminuted for example by grinding. The particle size is in the range of 0.01 μm to 1 mm, preferably in the range of 1 to 300 μm, for particular preference in the range of 2 to 20 μm.

The addition of the carbon blacks and/or graphites according to the invention can be effected before, during or after polymerisation or polycondensation of the monomers into the polyamide. If the addition of the carbon blacks and/or graphites according to the invention is effected after polymerisation, then it is effected preferably by addition to the thermoplastic melt in an extruder or in a kneader. According to the invention, the carbon blacks and/or graphites can also be added in metered amounts as highly concentrated master batches to polyamides which preferably have the same chemical composition as the polyamide matrix. The concentration of carbon blacks and/or graphites in the master batches is preferably in the range of 3 to 70, preferably from 5 to 50 and particularly preferred in the range of 7 to 35% by weight. According to the invention, the carbon blacks and/or graphites can be mixed also with binders, such as for example waxes, fatty acid esters or polyolefins, for improved meterability. According to the invention, the carbon blacks and/or graphites also with or without additional binders can be pelletized or granulated for example by pressing or compression methods, which likewise serves for better meterability. Also the polyamide oligomers can be already added to the master batches. This is advantageous since they facilitate dispersion of the conductivity additives both in the MB matrix and in the polyamide moulding compounds according to the invention. With such master batches, both the polyamide oligomers and the conductivity additives can be incorporated simultaneously into high-molecular weight polyamide.

In a preferred embodiment, also mixtures of a plurality of graphites, mixtures of a plurality of carbon blacks or mixtures of at least one graphite and at least one carbon black or mixtures of at least one carbon black and carbon nanofibrils can be used.

Conductivity carbon blacks according to the invention under the name Ketjenblack by the company AKZO Nobel, under the name Vulcan by the company Cabot or under the name Printex from the Degussa company can be used. Graphites according to the invention can be used as powders for example from the company Vogel & Prenner, Wiesbaden, Germany or SGL Carbon.

As further component, the thermoplastic moulding compounds can contain preferably a fibrous and/or particulate filler or reinforcing material or a mixture of two or more different fillers and/or reinforcing materials, for example based on talc, mica, silicate, quartz, titanium dioxide, wollastonite, kaolin, amorphous silicic acids, magnesium carbonate, magnesium hydroxide, chalk, limestone, feldspar, barium sulphate, glass balls and/or fibrous fillers and/or reinforcing materials based on carbon fibres, metal fibres and/or glass fibres. Preferably mineral particulate fillers are used based on talc, mica, silicate, quartz, titanium dioxide, wollastonite, kaolin, amorphous silicic acids, magnesium carbonate, chalk, feldspar, barium sulphate, long-term magnetic or magnetizable metal compounds, and/or alloys, glass balls or glass fibres. In particular mineral particulate fillers according to the invention are preferred, based on talc, wollastonite, kaolin and/or glass fibres. The fillers and reinforcing agents can also be surface-treated.

In particular when using glass fibres, in addition to silanes, also polymer dispersions, film-forming agents, branching agents and/or glass fibre processing aids can be used. Particularly preferred according to the invention are also glass fibres which in general have a fibre diameter between 7 and 18, preferably between 9 and 15 μm, and can be added as endless fibres or as cut or ground glass fibres, the fibres being able to be equipped with a suitable sizing system and an adhesive or adhesive system, e.g. on a silane basis.

The polyamide moulding compounds contain fillers and reinforcing materials in quantities of 0 to 95% by weight, preferably from 20 to 65% by weight and particularly preferred from 25 to 50% by weight, relative respectively to the entire polyamide moulding compound.

The combined addition of 10 to 70% by weight of fibrous and also 3 to 40% by weight of particulate fillers and/or reinforcing materials has proved thereby to be particularly advantageous.

Of course the thermoplastic polyamide moulding compounds according to the invention can furthermore contain normal additives which are known in general to the person skilled in the art, alone or in combination, said additives being selected from the group comprising impact strength agents, foreign polymers, adhesives, flameproofing agents, reinforcing agents, such as glass and C fibres, UV or heat stabilisers, stabilisers against weathering, minerals, processing aids, crystallisation accelerators or delayers, antioxidants, flow aids, lubricants, mould-release agents, plasticizers, fireproofing agents, pigments, colour and marking materials and fillers such as carbon black or graphite or also nanoparticles in lamellar form, corresponding to all additives known for polyamides, as are necessary for the respective application.

Also other common polymers, such as polyesters, polyolefins, polycarbonates, AN and ABS polymers, functionalised copolyolefins and ionomers, can be added to the above-described (co)polyamides or mixtures thereof.

As further additives, impact strength modifiers are added to the thermoplastic polyamide moulding compounds according to the invention. These are e.g. copolymers based on polyolefins of low glass conversion temperature which can contain acrylic acid or be grafted with maleic anhydride. In particular, impact strength modifiers, such as ethylene-propylene-copolyolefins or ethylene-propylene-diene-rubbers (EPDM) or acrylate rubbers, may be mentioned here.

In preferred embodiments, the moulding compounds contain furthermore nano-scale fillers. In a particular embodiment of the invention, the nano-scale fillers are either silicon dioxide or silicon dioxide hydrates. In the polyamide moulding compound, certain nano-scale fillers are present in one embodiment as uniformly dispersed, layer-shaped material.

As fillers, long-term magnetic or magnetizable metal compounds and/or alloys can furthermore be used. These are contained preferably in a quantity of 60 to 95% by weight in the polyamide moulding compound.

As fillers, metals or alloys, in particular rare earth metal powders, (including yttrium) of the rare earth metal/iron/boron type, are preferred, Nd/Fe/B, also described as "Neodymium", being particularly preferred.

Also the alloys which are known for magnetic materials, samarium/cobalt and samarium/thulium, ferrites, such as barium- and strontium ferrite and also carbonyl iron powder are advantageous. Suitable metal powders are described for example in the company brochure DR 9632 MAG of the company Delco Remy, Anderson, Ind. 46013, USA and have the title Magnequench® Products.

High quality magnetic products are in particular Nd/Fe/B; SmTm, e.g. $Sm_2Tm_{17}$; SmCo, e.g. $SmCo_5$. In principle however all magnetic and/or magnetizable metal powders and metal compounds are possible. It is thereby advantageous but not necessary that they are coated. Suitable coatings for ferrites are the state of the art.

The invention furthermore comprises moulded articles which can be produced with the above-described moulding compound. It should thereby be particularly emphasised that, as the applicant was able to show, the moulded articles have distortion of less than 6%, preferably less than 3%.

The invention relates finally also to the use of the above-described moulding compounds. The moulding compounds according to the invention are used in particular to produce moulded bodies, such as fibres, films, pipes, hollow bodies or other semi-finished products or readymade parts, e.g. by injection moulding, extrusion, pultrusion, injection blowing or other shaping techniques. The moulding compounds are used preferably to produce filled moulded articles.

The moulding compounds according to the invention are suitable in particular for producing thin-walled housings with an excellent surface, such as e.g. mobile telephone casings, or for the production of highly filled systems, such as e.g. polymer magnets.

The following examples explain the present invention without restricting it.

EXAMPLES AND COMPARISON EXAMPLES

Materials used:
Polyamides

| Polyamide type | Relative viscosity (0.5% in m-cresol) | Volume flow index (MVR) (275° C./5 kg (cm³/10 min)) |
|---|---|---|
| PA12 Grilamid L20*⁾ | 1.9 | 75-100 |
| Grilamid TR70*⁾ | 1.4-1.5 | 5-10 |

*⁾Commercial product by the company EMS-CHEMIE AG.

Carbon black

| Carbon black type | BET (ASTM D3037), [m2/g] | DBP (ASTM D2414) [ml/100 g] |
|---|---|---|
| Ensaco 250 Commercial product by the company Timcal/Belgium | 65 | 190 |
| Ketjenblack EC-600 JD Commercial product by the company Akzo Nobel | 1270 | 480-510 |

Oligomers
PA12 Oligomers of the Following Composition

| Polyamide type | Relative viscosity (0.5% in m-cresol) | End group concentration | Molar mass (g/mol) |
|---|---|---|---|
| PA12 oligomer | 1.1 | $NH_2$/COOH 20/50 | 2000 |

Glass Fibres
E-glass, Polyamide Type, Diameter 10 µm, Length 4.5 mm
Stabilisers
Irganox 245: Commercial Product by the Company Ciba Speciality Chemicals
Triethyleneglycol bis(3-(3'-tert-butyl-4'-hydroxy-5'-methylphenyl)propionate
Hostanox PAR24: Commercial Product by the Company Clariant tris(2,4-di-tert-butylphenyl)phosphite The antistatic moulding compounds according to the invention (VB1 and 2, and also B1 to B5) were produced on a Buss Co-Kneader MDK46 by the company Coperion at temperatures between 240 and 300° C. Polymers, stabilisers and oligomers were thereby metered into the extruder feed and also glass fibres and carbon blacks into the melt.

The moulding compounds according to the invention comprising VB3 and VB4, and also B6 and B7 were produced on a twin-screw kneader ZSK25 by the company Werner and Pfleiderer at temperatures between 240 and 300° C. Polymers, stabilisers and oligomers were thereby metered into the extruder feed and also glass fibres into the melt.

The produced moulding compounds were tested as follows:

| | |
|---|---|
| MVR: | (Melt volume rate) at 275° C. according to ISO 1133 |
| SZ: | impact strength according to ISO 179/1eU |
| KSZ: | notch-impact strength according to ISO 179/1eA |
| OWS: | specific surface resistance according to IEC60093 on 100 × 100 × 3 mm plates |

Yield stress, breaking elongation and modulus of elasticity in tension were determined according to ISO527.
Sour Gas Test:
The peroxide resistance was tested on 1 mm tensile impact bars. For this purpose, test bodies were stored in a mixture of 42.5% toluene, 42.5% isooctane and 15% methanol which contains in addition 180 mmol/l tert-butylhydroperoxide and 10 mg $Cu^{2+}$/l, at 60° C. for 15 days. The breaking elongation of the test pieces is compared before and after storage. The percentage change in breaking elongation is indicated in the Table.

The flow lengths were determined by means of an Arburg injection moulding machine (Type: ARBURG-ALL ROUNDER 320-210-750). Flow spirals of dimension 1.5 mm×10 mm were prepared at a compound temperature of 270° C. and a mould temperature of 80° C.

Table 1 summarises the compositions of Examples B1-B3 and of the comparison Example VB1 and also the properties of the polyamide moulding compounds produced.

Table 2 summarises the compositions of Examples B4 and B5 and of the comparison Example VB2 and also the properties of the polyamide moulding compounds produced.

The distortion was determined by means of an injection moulded "Visitor card holder". After 14 days storage in a normal atmosphere (23° C., 50% relative moisture), the width is measured and made into a ratio relative to the tool size (width of the cavity: 90.2 mm). The greater the difference, the greater the distortion. The moulded articles were produced on an Arburg injection moulding machine (Type ARBURG ALLROUNDER 320-210-750) at a compound temperature of 270° C. and a mould temperature of 80° C. The results are summarized in Table 4.

TABLE 1

| Components | Condition | Unit | VB1 | B1 | B2 | B3 |
|---|---|---|---|---|---|---|
| Composition | | | | | | |
| Grilamid L20 (polyamide 12) | | % by wt. | 62.65 | 57.65 | 52.65 | 47.65 |
| PA12 oligomer | | % by wt. | 0 | 5.00 | 10.00 | 15.00 |
| Glass fibre | | % by wt. | 20.00 | 20.00 | 20.00 | 20.00 |
| Carbon black ENSACO 250 | | % by wt. | 17.00 | 17.00 | 17.00 | 17.00 |
| HOSTANOX PAR 24 | | % by wt. | 0.10 | 0.10 | 0.10 | 0.10 |
| IRGANOX 245 | | % by wt. | 0.25 | 0.25 | 0.25 | 0.25 |
| Properties of the polyamide moulding compounds | | | | | | |
| H$_2$O content | | % by wt. | 0.003 | 0.05 | 0.02 | 0.04 |
| MVR | 275° C.; 10 kg | cm$^3$/10 min | 26 | 49 | 81 | 213 |
| Flow length | | mm | 152 | 188 | 219 | 257 |
| Tension E-modulus | — | MPa | 5400 | 5200 | 5000 | 5000 |
| Yield stress | — | MPa | 93 | 93 | 92 | 92 |
| Yield elongation | — | % | 3.7 | 3.9 | 4.1 | 4 |
| Breaking stress | — | MPa | 90 | 92 | 91 | 91 |
| Breaking elongation | — | % | 5.7 | 5.2 | 5.3 | 4.6 |
| SZ | 23° C. | kJ/m$^2$ | 66 | 68 | 63 | 52 |
| SZ | −30° C. | kJ/m$^2$ | 50 | 46 | 38 | 30 |
| KSZ | 23° C. | kJ/m$^2$ | 11.4 | 10 | 7.7 | 6.8 |
| KSZ | −30° C. | kJ/m$^2$ | 5.7 | 5.6 | 5.4 | 5.2 |
| OWS | — | ohm | 2.60E+05 | 1.50E+04 | 1.00E+04 | 9.60E+03 |
| Sourgas (%) | | | +62 | +56 | +45 | +30 |

Table 3 summarises the compositions of Examples B6 and B7 and the comparison Examples VB3 and VB4 and also the properties of the polyamide moulding compounds produced.

Table 4 summarises the compositions of Examples B8-B15 and the comparison Examples VB5-VB7 and also the properties of the polyamide moulding compounds produced.

The mechanical values were determined in the dry state.

The Figure shows an injection moulded article on which determination of distortion is implemented.

The homopolyamide used PA MACM12 had a solution viscosity (0.5% in m-cresol) of 1.67, the copolyamide PA616T a solution viscosity of 1.42.

The following particulate fillers were used:

| Title | Composition | Producer/Supplier |
|---|---|---|
| Microtalc IT extra | Magnesium silicate | Norwegian Talc. B.V. |
| Microcarb-OG | Calcium carbonate ground | OMYA AG (Switzerland) |
| Socal U1 | Calcium carbonate precipitated | Solvay Advanced Functional Materials (Italy) |
| Kaolin (china clay) | Aluminium silicate | ECC International Ltd. (UK-Cornwall) |

TABLE 2

| Components | Condition | Unit | VB2 | B4 | B5 |
|---|---|---|---|---|---|
| Composition | | | | | |
| Grilamid L20 (polyamide 12) | | % by wt. | 62.5 | 57.65 | 52.65 |
| PA12 oligomer | | % by wt. | 0 | 5.00 | 10.00 |
| Glass fibre | | % by wt. | 30.00 | 30.00 | 30.00 |
| Carbon black Ketjenblack EC-600 JD | | % by wt. | 7.00 | 7.00 | 7.00 |
| HOSTANOX PAR24 | | % by wt. | 0.10 | 0.10 | 0.10 |
| IRGANOX 245 | | % by wt. | 0.25 | 0.25 | 0.25 |
| Properties of the polyamide moulding compounds | | | | | |
| H$_2$O content | | % by wt. | 0.08 | 0.03 | 0.03 |
| MVR | 275° C./ 216 kg | cm$^3$/10 min | 27 | 37 | 66 |
| Flow length | | mm | 124 | 146 | 172 |
| Tension E-modulus | — | MPa | 7200 | 7200 | 7100 |
| Breaking stress | — | MPa | 120 | 120 | 120 |
| Breaking elongation | — | % | 6.5 | 5.7 | 5.5 |
| SZ | 23° C. | kJ/m$^2$ | 90 | 80 | 80 |

TABLE 2-continued

| Components | Condition | Unit | VB2 | B4 | B5 |
|---|---|---|---|---|---|
| SZ | −30° C. | kJ/m² | 90 | 85 | 65 |
| KSZ | 23° C. | kJ/m² | 15 | 13 | 11 |
| KSZ | −30° C. | kJ/m² | 13 | 9 | 8 |
| OWS | — | ohm | 110 | 180 | 180 |
| Sourgas (%) | | | +15 | +25 | +15 |

TABLE 3

| Components | Condition | Unit | VB3 | B6 | VB4 | B7 |
|---|---|---|---|---|---|---|
| Composition | | | | | | |
| Grilamid L20 (polyamide 12) | | % by wt. | 34.7 | 33.19 | 26.075 | 23.465 |
| PA12 oligomer | | % by wt. | 0 | 1.735 | 0 | 3.47 |
| Glass fibre | | % by wt. | 65 | 65 | 65 | 65 |
| Grilamid TR70 | | % by wt. | 0 | 0 | 8.675 | 7.82 |
| HOSTANOX PAR 24 | | % by wt. | 0.05 | 0.05 | 0 | 0 |
| IRGANOX 245 | | % by wt. | 0.25 | 0.025 | 0.25 | 0.25 |
| Properties of the polyamide moulding compounds | | | | | | |
| H₂O content | | % by wt. | 0.02 | 0.03 | 0.02 | 0.01 |
| MVR | 275° C.; 5 kg | cm³/10 min | 52 | 112 | 5.4 | 9.7 |
| Flow length | | mm | 146 | 163 | 133 | 182 |
| Tension E-modulus | — | MPa | 17000 | 17000 | 18200 | 18500 |
| Breaking stress | — | MPa | 171 | 171 | 189 | 184 |
| Breaking elongation | — | % | 4.5 | 4 | 3.4 | 2.6 |
| SZ | 23° C. | kJ/m² | 61 | 61 | 67 | 52 |
| SZ | −30° C. | kJ/m² | 75 | 64 | 74 | 55 |
| KSZ | 23° C. | kJ/m² | 21 | 19 | 17 | 14 |
| KSZ | −30° C. | kJ/m² | 17 | 16 | 14 | 11 |

TABLE 4

| Components | Unit | B8 | B9 | B10 | B11 | B12 | B13 | B14 | B15 | VB5 | VB6 | VB7 |
|---|---|---|---|---|---|---|---|---|---|---|---|---|
| Composition | | | | | | | | | | | | |
| PA MACM12 | % by wt. | 63 | 45 | 36 | 36 | 36 | 36 | 36 | | | | |
| PA 6I6T (30:70) | % by wt | | | | | | | | 47 | | | |
| PA 66 | | | | | | | | | | 40 | 45 | |
| PA 12 Oligomer | % by wt. | 7 | 5 | 4 | 4 | 4 | 4 | 4 | 3 | 0 | 0 | 50 |
| Glass fibre | % by wt | 30 | 50 | 50 | 40 | 30 | 40 | 40 | 40 | 30 | 50 | 0 |
| Millicarb | % by wt. | | | 10 | 20 | | | | 10 | | 5 | 40 |
| Kaolin | % by wt | | | | | 30 | | | | | 5 | 10 |
| Socal UI | % by wt. | | | | | | | 20 | | 30 | | |
| Microtalc IT extra | % by wt. | | | | | | 20 | | | | | |
| Properties of the polyamide moulding compounds | | | | | | | | | | | | |
| Water content | % by wt. | 0.03 | 0.03 | 0.02 | 0.03 | 0.03 | 0.03 | 0.03 | 0.02 | 0.02 | 0.02 | 0.02 |
| MVR (275°/5 kg) | ccm/10 min | 56 | 27 | 13 | 14 | 15 | 16 | 14 | 25 | 14 | 12 | 22 |
| Distortion | % | 1.6 | 2.0 | 2.0 | 1.8 | 1.5 | 1.6 | 1.9 | 1.3 | 5.1 | 5.1 | 5.3 |

The invention claimed is:

1. Polyamide moulding composition containing 70 to 99.5% by weight of at least one thermoplastic polyamide and 0.5 to 30% by weight of at least one polyamide oligomer, produced by condensation of polyamide-forming monomers and additional monofunctionally acting structural elements, with linear or branched chain structure with a number average molar mass of 800 to 5000 g/mol with end groups which are partially basic end groups which are at least partially NH₂ end groups, and carboxyl end groups, one of these end groups being present in excess and the concentration of the end group present in excess being at most 300 mmol/kg, wherein 60 to 80% of the end groups are formed by monofunctionally acting structural elements and are no longer condensation active.

2. Polyamide moulding composition according to claim 1, wherein the concentration of the end group present in excess is at most 100 mmol/kg.

3. Polyamide moulding composition according to claim 2, wherein the concentration of the end group present in excess is at least 20 mmol/kg.

4. Polyamide moulding composition according to claim 1, wherein the ratio of the end group present in excess to the end group present in deficit is at least 2:1.

5. Polyamide moulding composition according to claim 1, wherein the basic end groups are selected from primary, secondary, tertiary amino end groups or carboxylate.

6. Polyamide moulding composition according to claim 1, wherein the polyamide oligomer is obtained from the polyamide-forming monomers diamine and/or dicarboxylic acid and/or amino carboxylic acid or lactam and also structural elements acting monofunctionally with respect to the condensation reaction selected from amine and/or carboxylic acid.

7. Polyamide moulding composition according to claim 6, wherein the structural elements are an inhibited amine and/or a sterically inhibited phenol.

8. Polyamide moulding composition according to claim 7, wherein the structural elements are defined by the formulae I to IV:

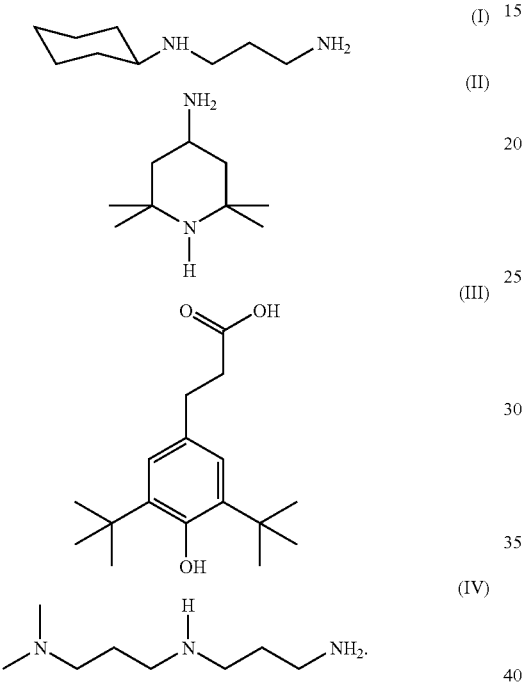

9. Polyamide moulding composition according to claim 1, wherein the at least one thermoplastic polyamide was obtained from the polyamide-forming monomers diamine and/or dicarboxylic acid and/or amino acid or lactam.

10. Polyamide moulding composition according to claim 9, wherein ω-amino carboxylic acids with 4 to 44 carbon atoms and/or aromatics ω-amino carboxylic acids with 6 to 20 carbon atoms are selected as amino acid and those with 2 to 44 carbon atoms as dicarboxylic acid.

11. Polyamide moulding composition according to claim 9, wherein the polyamides are selected from homo- and/or copolyamides based on PA6, PA66, PA46, PA11, PA 12, PA 1212, PA1012, PA610, PA612, PA69, PA1010, PA6T, PA6T6I, PA6T66, PA9T, PA10T, PA12T, PA12I, PA6I, 6I/6T, MXDI/6I, MXDI/MXDT/6I/6T, MXDI/12I, MACMI/12, MACMI/MACMT/12, 6I/MACMI/12, 6I/6T/MACMI/-MACMT/12, PACM6/11, PACM 12, PACMI/PACM12, MACM6/11, MACM12, MACMI/MACM12, MACM12/PACM12, 6I/6T/PACMI/PACMT/PACM12/612 and/or mixtures thereof.

12. Polyamide moulding composition consisting of:
(a) 70 to 99.5% by weight of at least one thermoplastic polyamide;
(b) 0.5 to 30% by weight of at least one polyamide oligomer, produced by condensation of polyamide-forming monomers and additional monofunctionally acting structural elements, with linear or branched chain structure with a number average molar mass of 800 to 5000 g/mol with end groups which are partially basic end groups which are at least partially $NH_2$ end groups, and carboxyl end groups, one of these end groups being present in excess and the concentration of the end group present in excess being at most 300 mmol/kg, wherein 60 to 80% of the end groups are formed by monofunctionally acting structural elements and are no longer condensation active;
(c) 1 to 50% by weight of a conductivity additive, relative to the total polyamide moulding composition; and
(d) up to 95% by weight of filler and/or reinforcing materials and also additive materials, relative to the total polyamide moulding composition, the fillers and/or reinforcing materials are selected from fibrous and/or particulate materials, and the additive materials are selected from adhesives, flameproofing agents, stabilizers, minerals, processing aids, crystallization accelerators or delayers, antioxidants, flow aids, lubricants, mould-release agents, plasticisers, fireproofing agents, pigments and/or colour and marking materials.

13. Polyamide moulding composition according to claim 12, wherein the moulding composition contains 3 to 25% by weight of the conductivity additive, relative to the total polyamide moulding composition.

14. Polyamide moulding composition according to claim 12, wherein the conductivity additive is selected from carbon black, carbon nanofibrils, graphite and mixtures thereof.

15. Polyamide moulding composition according to claim 14, wherein the carbon nanofibrils are present in tubular form and are formed from graphite layers.

16. Polyamide moulding composition according to claim 14, wherein the carbon nanofibrils have a length-to-diameter ratio of at least 5:1.

17. Polyamide moulding composition according to claim 16, wherein the length-to-diameter ratio is at least 100:1.

18. Polyamide moulding composition according to claim 14, wherein the carbon black is present in particle form, primary particle sizes between 0.005 and 0.2 μm being present.

19. Polyamide moulding composition according to claim 14, wherein the carbon black has a BET surface measured according to ASTM standard D3037-89 of greater than 200 $m^2/g$ and a DBP absorption measured according to ASTM standard D2414-90 of greater than 300 ml/100 g.

20. Polyamide moulding composition according to claim 14, wherein the carbon black has a BET surface measured according to ASTM standard D3037-89 in the range of 300 to 2000 $m^2/g$ and a DBP absorption measured according to ASTM standard D2414-90 in the range of 350 to 1000 ml/100 g.

21. Polyamide moulding composition according to claim 12, wherein the moulding composition contains 10 to 70% by weight fibrous and 3 to 40% by weight particulate fillers and/or reinforcing materials, relative to the total polyamide moulding composition.

22. Polyamide moulding composition according to claim 12, wherein mixtures of at least two fillers and/or reinforcing materials are used as filler and/or reinforcing material.

23. Polyamide moulding composition according to claim 12, wherein the fillers and/or reinforcing materials are selected from talc, mica, silicate, quartz, titanium dioxide, wollastonite, kaolin, silicic acids, magnesium carbonate, magnesium hydroxide, chalk, ground or precipitated calcium carbonate, limestone, feldspar, barium sulphate, long-term magnetic or magnetisable metal compositions and/or alloys, glass balls, glass fibres and/or further fibrous fillers and/or reinforcing materials.

24. Polyamide moulding composition according to claim 1, wherein the basic end groups are present in excess.

25. Polyamide moulding composition according to claim 1, wherein the carboxyl end groups are present in excess.

26. Polyamide moulding composition according to claim 1, wherein the moulding compound contains at least one amorphous or microcrystalline polyamide.

27. Polyamide moulding composition according to claim 1, wherein the moulding compound contains at least one partially crystalline polyamide.

28. Polyamide moulding composition according to claim 1, wherein the moulding compound contains a combination of at least one amorphous or one microcrystalline polyamide and at least one partially crystalline polyamide.

29. Moulded article, produced from a polyamide moulding composition according to claim 12, wherein the moulded article has a distortion of less than 5%.

30. A method of producing a moulded body comprising injection moulding, extrusion, pultrusion, or injection blowing polyamide moulding composition according to claim 12.

31. The method according to claim 30, wherein the moulded body comprises fibres, films, pipers, or hollow bodies.

32. The method according to claim 30, wherein the moulded body comprises semi-finished products or readymade parts.

33. Polyamide moulding composition according to claim 16, wherein the length-to-diameter ratio is at least 1000:1.

34. Moulded article, producible from a polyamide moulding composition according to claim 29, wherein the moulded article has a distortion of less than 3%.

* * * * *